United States Patent
Amaki et al.

(10) Patent No.: US 11,954,357 B2
(45) Date of Patent: Apr. 9, 2024

(54) MEMORY SYSTEM AND MEMORY SYSTEM CONTROL METHOD

(71) Applicant: Kioxia Corporation, Tokyo (JP)

(72) Inventors: Takehiko Amaki, Yokohama (JP);
Shunichi Igahara, Fujisawa (JP);
Toshikatsu Hida, Yokohama (JP);
Yoshihisa Kojima, Kawasaki (JP); Riki Suzuki, Yokohama (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/468,895

(22) Filed: Sep. 8, 2021

(65) Prior Publication Data
US 2022/0300190 A1    Sep. 22, 2022

(30) Foreign Application Priority Data
Mar. 22, 2021    (JP) .................................. 2021-047533

(51) Int. Cl.
*G06F 3/06* (2006.01)

(52) U.S. Cl.
CPC .......... *G06F 3/0655* (2013.01); *G06F 3/0604* (2013.01); *G06F 3/0638* (2013.01); *G06F 3/064* (2013.01); *G06F 3/0679* (2013.01)

(58) Field of Classification Search
CPC .... G06F 3/0655; G06F 3/0604; G06F 3/0638; G06F 3/064; G06F 3/0679
See application file for complete search history.

(56) References Cited

U.S. PATENT DOCUMENTS

| | | | |
|---|---|---|---|
| 8,886,990 B2 | 11/2014 | Meir et al. | |
| 9,934,151 B2 | 4/2018 | Kan | |
| 2006/0039196 A1* | 2/2006 | Gorobets | G06F 11/106 714/E11.038 |
| 2009/0282301 A1* | 11/2009 | Flynn | G06F 12/0246 714/763 |
| 2010/0011153 A1* | 1/2010 | Yeh | G06F 12/0246 711/E12.008 |

(Continued)

FOREIGN PATENT DOCUMENTS

| | | |
|---|---|---|
| JP | 2013-114679 A | 6/2013 |
| JP | 5674999 B2 | 2/2015 |

*Primary Examiner* — Francisco A Grullon
(74) *Attorney, Agent, or Firm* — Oblon, McClelland, Maier & Neustadt, L.L.P.

(57) ABSTRACT

According to one embodiment, a memory system includes a nonvolatile memory and a memory controller. The nonvolatile memory includes blocks each including memory cells. The memory controller is configured to control access to the nonvolatile memory. The memory controller is configured to: set a first block, among the plurality of blocks, to be written in a first mode, the first mode being a mode in which data of a first number of bits is written into the memory cell, and set a plurality of second blocks, among the plurality of blocks, to be written in a second mode, the second mode being a mode in which data of a second number of bits is written into the memory cell, the second number being larger than the first number; acquire access information related to the second blocks; and change a writing mode of the first block which has been set in the first mode to the second mode when a first condition of the second blocks based on the access information is satisfied.

20 Claims, 12 Drawing Sheets

(56) References Cited

U.S. PATENT DOCUMENTS

| | | | | |
|---|---|---|---|---|
| 2010/0131723 A1* | 5/2010 | Yorimitsu | ............. | G06F 3/0674 |
| | | | | 711/E12.001 |
| 2013/0138870 A1* | 5/2013 | Yoon | ................... | G06F 11/1072 |
| | | | | 711/E12.008 |
| 2017/0038969 A1* | 2/2017 | Choi | ..................... | G06F 3/0656 |
| 2017/0039142 A1* | 2/2017 | Sundararaman | ...... | G06F 3/0665 |
| 2018/0211708 A1* | 7/2018 | Igahara | ................ | G06F 3/0659 |
| 2019/0095116 A1* | 3/2019 | Igahara | ................ | G06F 3/0634 |
| 2019/0294358 A1* | 9/2019 | Suzuki | .................... | G06F 3/064 |
| 2020/0143891 A1* | 5/2020 | Takeyama | ............. | G11C 11/409 |
| 2021/0064249 A1* | 3/2021 | Mehta | ................. | G06F 11/1048 |
| 2021/0209016 A1* | 7/2021 | Muchherla | .......... | G06F 11/3037 |
| 2021/0405900 A1* | 12/2021 | Kurita | ................... | G06F 3/0659 |

\* cited by examiner

| SEGMENT | CORRE-SPONDING LBA | PHYSICAL ADDRESS | STATE |
|---|---|---|---|
| 0 | 0 TO 127 | (0x00, 0x05 0x10···) 128 ADDRESSES | UNWRITTEN |
| 1 | 128 TO 255 | (0x06, 0x02 0x17···) 128 ADDRESSES | UPDATED AND NOT NON-VOLATILIZED (DIRTY) |
| 2 | 256 TO 383 | (0x08, 0x99 0x55···) 128 ADDRESSES | UPDATED AND NOT NON-VOLATILIZED (DIRTY) |
| 3 | 384 TO 511 | (0x10, 0x18 0x01···) 128 ADDRESSES | UPDATED AND NON-VOLATILIZED (NON-DIRTY) |
| 4 | 512 TO 639 | - | UNMAPPED STATE |
| ... | | | |

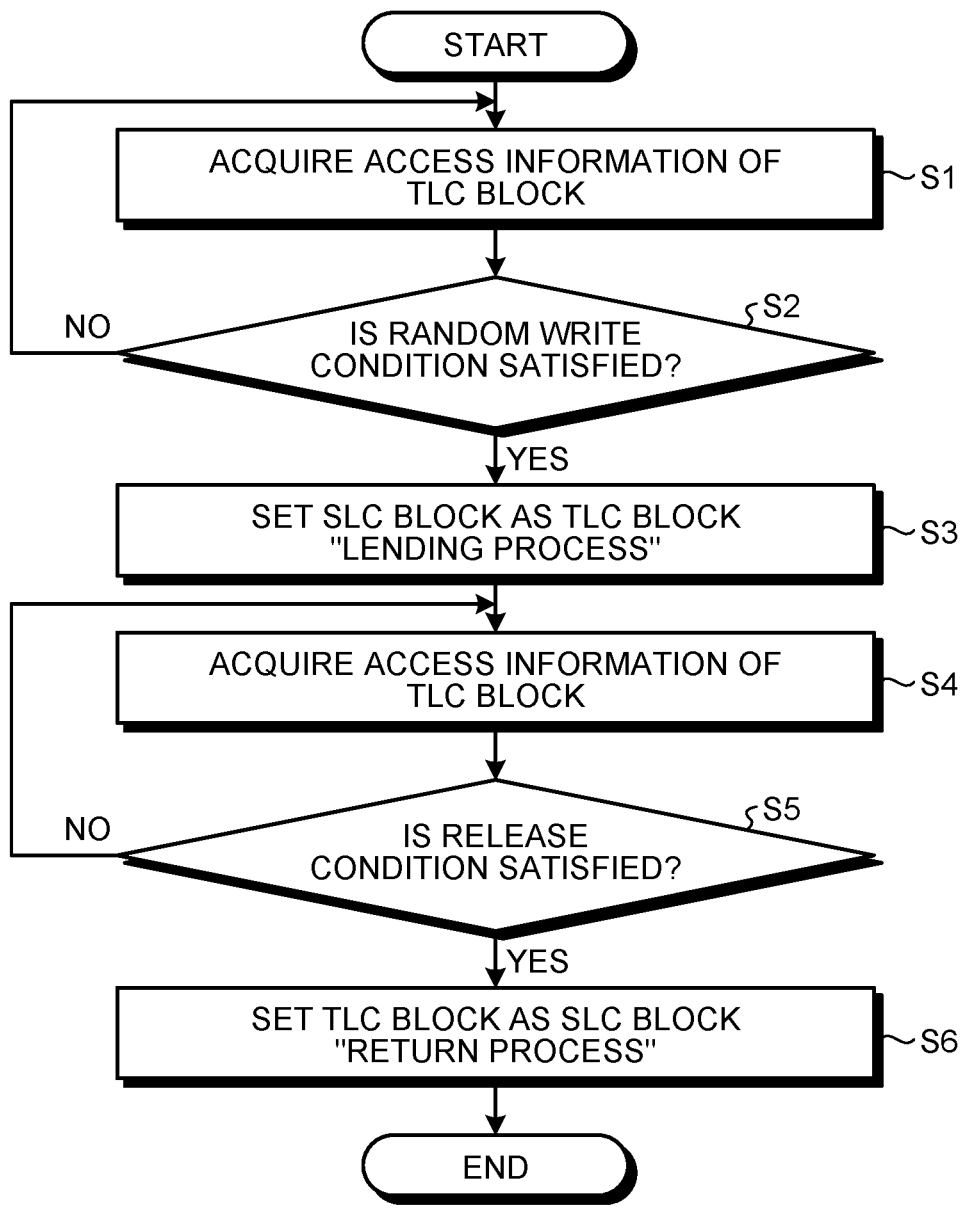

MEMORY SYSTEM AND MEMORY SYSTEM CONTROL METHOD

CROSS-REFERENCE TO RELATED APPLICATIONS

This application is based upon and claims the benefit of priority from Japanese Patent Application No. 2021-047533, filed on Mar. 22, 2021; the entire contents of which are incorporated herein by reference.

FIELD

Embodiments described herein relate generally to a memory system and a memory system control method.

BACKGROUND

There is a memory system configured to be able to change a storage mode corresponding to the number of bits (n bits/cell) stored per memory cell. Access performance from a host to the memory system is affected by the number of bits of the storage mode.

BRIEF DESCRIPTION OF THE DRAWINGS

FIG. 13 is a flowchart illustrating a processing procedure of setting an SLC block as a TLC block of the embodiment.

DETAILED DESCRIPTION

According to one embodiment, a memory system includes a nonvolatile memory and a memory controller. The nonvolatile memory includes a plurality of blocks each including a plurality of memory cells. The memory controller is configured to control access to the nonvolatile memory. The memory controller is configured to: set a first block, among the plurality of blocks, to be written in a first mode, the first mode being a mode in which data of a first number of bits is written into the memory cell, and set a plurality of second blocks, among the plurality of blocks, to be written in a second mode, the second mode being a mode in which data of a second number of bits is written into the memory cell, the second number being larger than the first number; acquire access information related to the plurality of second blocks; and change a writing mode of the first block which has been set in the first mode to the second mode when a first condition of the second blocks based on the access information is satisfied.

Hereinafter, as an example, a memory system and a memory system control method according to an embodiment will be described. Exemplary embodiments of a memory system will be explained below in detail with reference to the accompanying drawings. The present invention is not limited to the following embodiments.

(Example of Configuration of Memory System)

Figure 1:
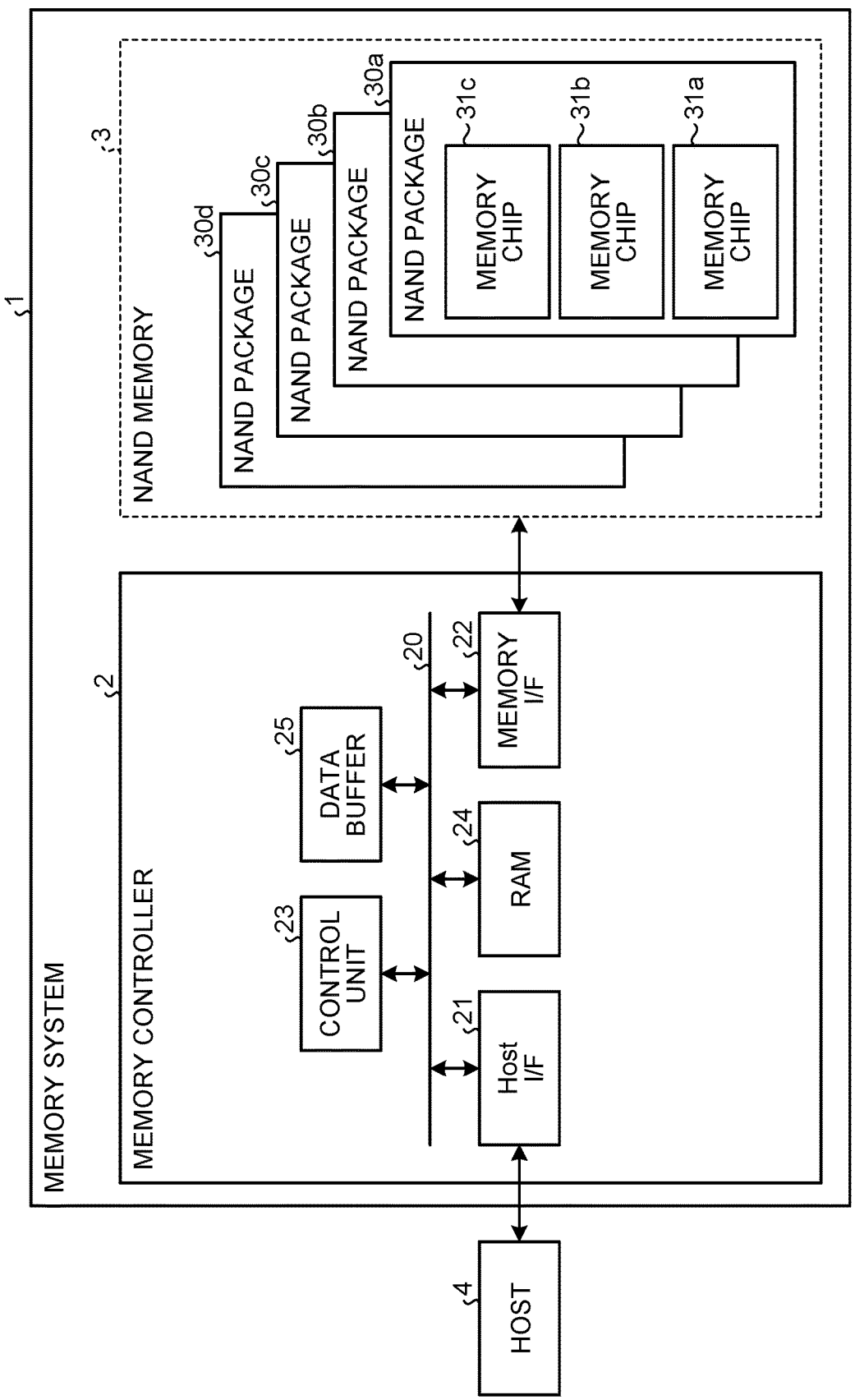
FIG. 1 is a block diagram illustrating an example of a schematic configuration of a memory system according to an embodiment.

FIG. 1 is a block diagram illustrating an example of a schematic configuration of a memory system 1 according to an embodiment. As illustrated in FIG. 1, the memory system 1 includes a memory controller 2 and a NAND flash memory 3 (hereinafter, also simply referred to as the NAND memory 3).

The memory system 1 may be a memory card or the like in which the memory controller 2 and the NAND memory 3 are configured as one package, or may be a solid state drive (SSD) or the like. The memory system 1 can be connected to a host 4. Examples of the host 4 may include an information processing device such as a personal computer, a server, or a storage box, a mobile phone, an imaging device, a mobile terminal such as a tablet computer or a smartphone, a game machine, or an in-vehicle terminal such as a car navigation system.

The NAND memory 3 is a nonvolatile memory that stores data in a nonvolatile manner. In the following description, a case where the NAND memory 3 having a two-dimensional (planar) structure is used as the nonvolatile memory will be described, but the example of the nonvolatile memory is not limited thereto. The nonvolatile memory may be, for example, a NOR flash memory or a three-dimensional structure flash memory.

The memory controller 2 performs a control of the NAND memory 3.

For example, the memory controller 2 stores, in the NAND memory 3, data requested to be written from the host 4, or reads and transmits, from the NAND memory 3 to the host 4, data requested to be read from the host 4. In addition, the memory controller 2 performs transcription processing of transcribing data in the NAND memory 3. The transcription processing includes garbage collection and the like.

The memory controller 2 includes a host interface (host I/F) 21, a memory interface (memory I/F) 22, a control unit 23, a random access memory (RAM) 24, and a data buffer 25. The host I/F 21, the memory I/F 22, the control unit 23, the RAM 24, and the data buffer 25 are mutually connected by an internal bus 20.

The memory controller 2 can be configured as, for example, a system-on-a-chip (SoC). Alternatively, the memory controller 2 can be constituted by a plurality of chips. The RAM 24 or the data buffer 25 may be disposed outside the memory controller 2.

The host I/F 21 outputs an access command, user data, and the like received from the host 4 to the internal bus 20. The user data is transmitted to the data buffer 25 via the internal bus 20.

In addition, the host I/F 21 transmits user data read from the NAND memory 3, a response from the control unit 23, and the like to the host 4.

The data buffer 25 is a memory that functions as a buffer for data transfer between the host 4 and the NAND memory 3. The data buffer 25 may be implemented by, for example, a volatile memory such as a static random access memory (SRAM) or a synchronous dynamic random access memory (SDRAM). Note that the type of memory implementing the data buffer 25 is not limited thereto.

The memory I/F 22 controls processing of writing user data or the like in the NAND memory 3 and processing of reading user data or the like from the NAND memory 3 based on an instruction from the control unit 23.

The control unit 23 is a circuit capable of executing a computer program. The control unit 23 is, for example, a central processing unit (CPU). The control unit 23 integrally controls each component of the memory controller 2 based on a firmware program stored in advance at a predetermined position (for example, the NAND memory 3), thereby implementing various processes including host access processing and transcription processing.

Note that some or all of the processes performed by the control unit 23 may be performed by a hardware circuit. Some or all of the processes performed by the control unit 23 may be performed by a field-programmable gate array (FPGA) or an application specific integrated circuit (ASIC).

The RAM 24 provides, to the control unit 23, a function as a buffer, a cache, or a working memory. The RAM 24 is implemented by a dynamic random access memory (DRAM), an SRAM, or a combination thereof. Note that the type of memory implementing the RAM 24 is not limited thereto.

Note that the memory controller 2 can include any component instead of or in addition to these components. For example, the memory controller 2 may include a circuit that performs predetermined processing (for example, encoding or decoding) on the user data.

Each NAND package 30 includes, for example, a plurality of NAND flash memory chips. FIG. 1 illustrates three memory chips 31a to 31c. However, the number of memory chips is not limited to three. Note that each memory chip may be simply described as the memory chip 31 without distinction.

Figure 2:
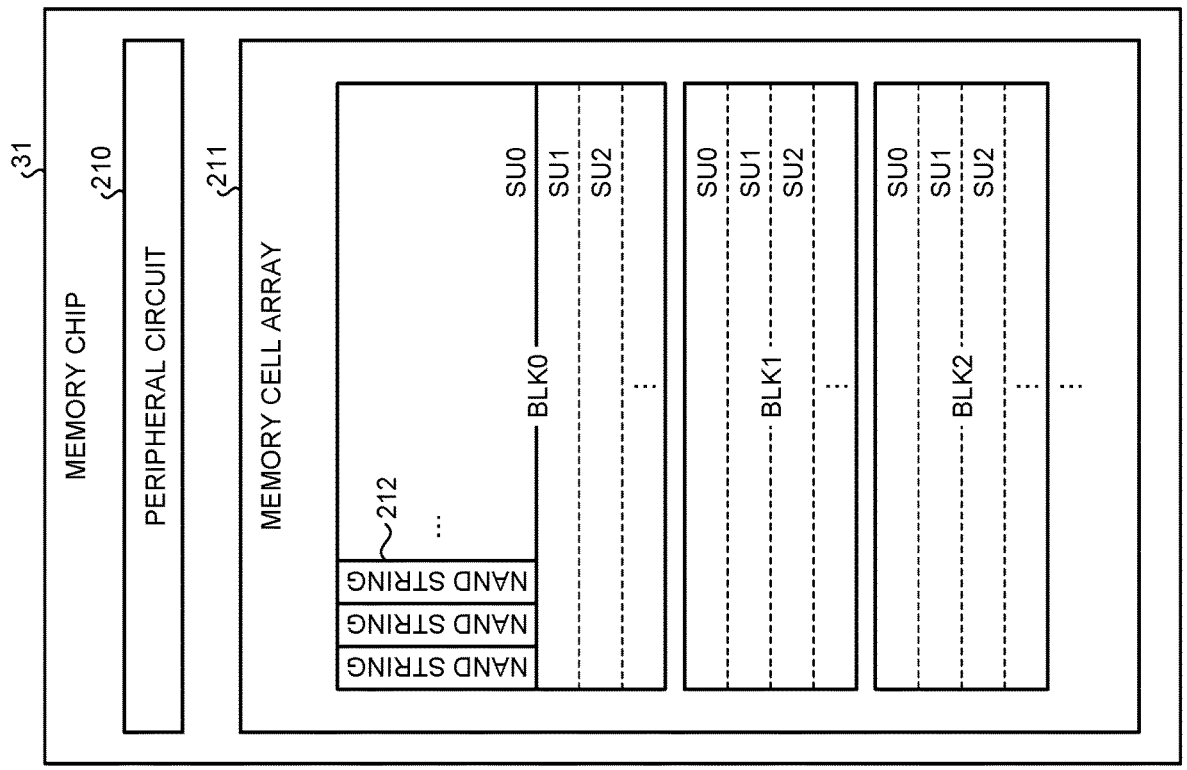
FIG. 2 is a diagram illustrating an example of a configuration of a memory chip according to the embodiment.

FIG. 2 is a diagram illustrating an example of a configuration of the memory chip 31 according to the embodiment. The memory chip 31 includes a peripheral circuit 210 and a memory cell array 211.

The memory cell array 211 includes a plurality of blocks BLK (BLK0, BLK1, BLK2, and the like). Each block BLK includes a plurality of string units SU (SU0, SU1, SU2, and the like). Each string unit SU includes a plurality of NAND strings 212 in which a plurality of nonvolatile memory cell transistors are connected in series. That is, each string unit SU is an assembly of a plurality of nonvolatile memory cell transistors. Note that the number of NAND strings 212 provided in the string unit SU is arbitrary.

The peripheral circuit 210 may include, for example, a row decoder, a column decoder, a sense amplifier, and a voltage generation circuit (not illustrated). In response to an instruction from the memory controller 2, the peripheral circuit 210 in the memory chip 31 performs an operation corresponding to the instruction with respect to the memory cell array 211. The instruction from the memory controller 2 may typically include writing, reading, and erasing.

Figure 3:
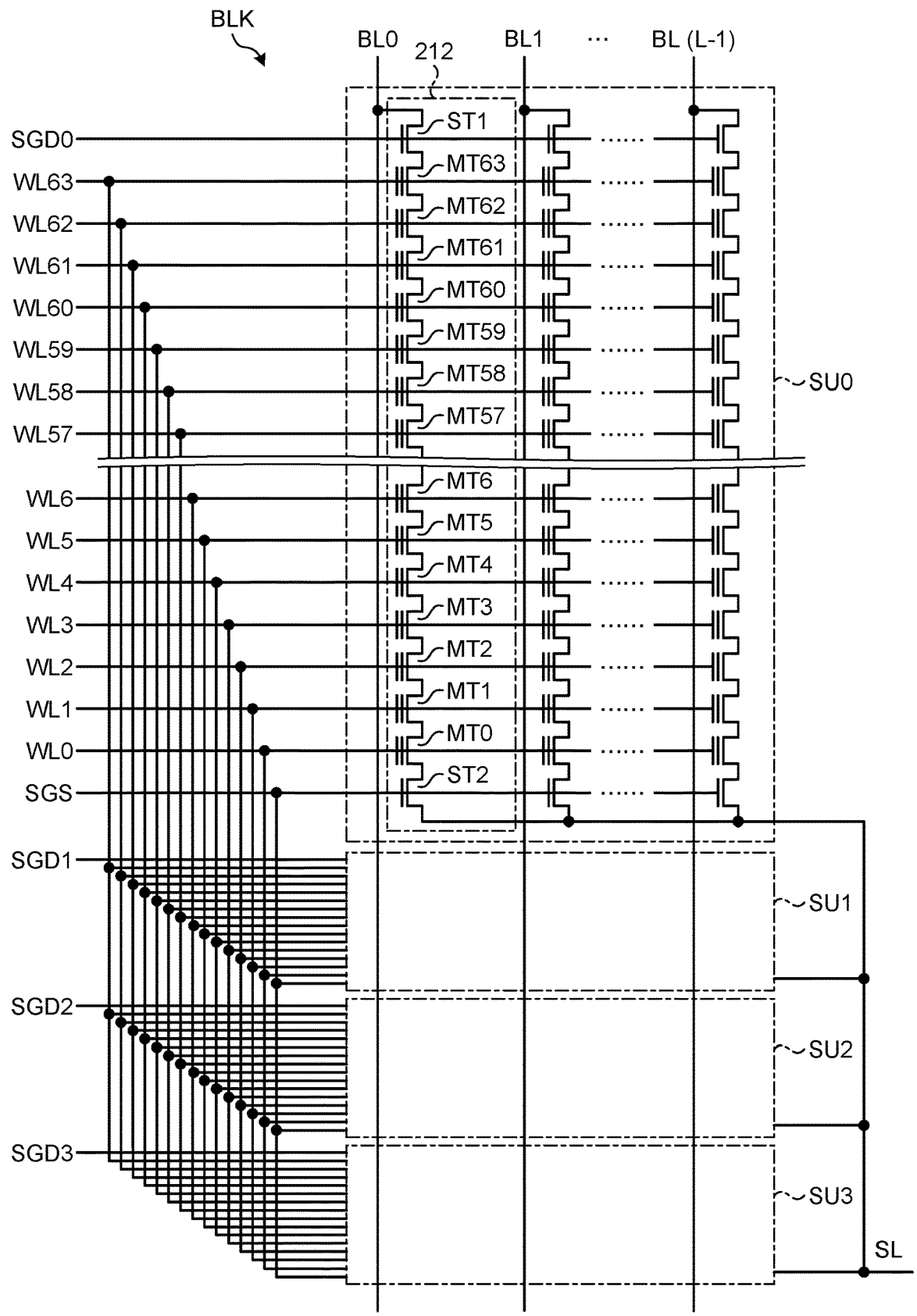
FIG. 3 is a schematic diagram illustrating a circuit configuration of a block according to the embodiment.

FIG. 3 is a schematic diagram illustrating a circuit configuration of the block BLK according to the embodiment. Note that the respective blocks BLK have the same configuration. The block BLK includes, for example, four string units SU0 to SU3. Each string unit SU includes the plurality of NAND strings 212.

Each NAND string 212 includes, for example, 64 memory cell transistors MT (MT0 to MT63) and select transistors ST1 and ST2. The memory cell transistor MT includes a control gate and a charge storage layer, and stores data in a nonvolatile manner. 64 memory cell transistors MT0 to MT63 are connected in series between a source of the select transistor ST1 and a drain of the select transistor ST2. Note that the memory cell transistor MT may be a MONOS type using an insulating film for the charge storage layer, or may be an FG type using a conductive film for the charge storage layer. Furthermore, the number of memory cell transistors MT in the NAND string 212 is not limited to 64.

Gates of the select transistors ST1 of the NAND strings 212 in the string units SU0 to SU3 are connected to select gate lines SGD0 to SGD3, respectively. On the other hand, gates of the select transistors ST2 of the NAND strings 212 in the string units SU0 to SU3 may be commonly connected to, for example, a select gate line SGS. Alternatively, the gates of the select transistors ST2 of the NAND strings 212 in the string units SU0 to SU3 may be connected to select gate lines SGS0 to SGS3 (not illustrated) different for each string unit SU.

The control gates of the memory cell transistors MT0 to MT63 in the same block BLK are commonly connected to word lines WL0 to WL63, respectively.

Drains of the select transistors ST1 of the respective NAND strings 212 in the string unit SU are connected to different bit lines BL (BL0 to BL(L−1), where L is a natural number of 2 or more). In addition, the bit line BL commonly connects one NAND string 212 in each string unit SU among the plurality of blocks BLK. Furthermore, a source of each select transistor ST2 in the same block BLk is commonly connected to a source line SL.

That is, the string unit SU is a set of the plurality of NAND strings 212 connected to different bit lines BL, respectively, and connected to the same select gate line SGD. The block BLK is a set of the plurality of string units SU sharing the word line WL. The memory cell array 211 is a set of the plurality of blocks BLK sharing at least one bit line BL.

Writing performed by the peripheral circuit 210 can be collectively performed with respect to the memory cell transistors MT connected to one word line WL in one string unit SU. Similarly, reading performed by the peripheral circuit 210 can be collectively performed with respect to the memory cell transistors MT connected to one word line WL in one string unit SU. A group of the memory cell transistors MT selected collectively at the time of performing writing and reading is referred to as a memory cell group MCG. Further, a unit of a set of pieces of 1-bit data to be written in or read from one memory cell group MCG is referred to as a page. For example, the set of pieces may be "11", "01", "00", and "10".

Erasing performed by the peripheral circuit 210 is performed in units of blocks BLK. That is, all pieces of data stored in one block BLK are erased collectively.

Note that the configuration of the memory cell array 211 is not limited to the configuration illustrated in FIGS. 2 and 3. For example, the memory cell array 211 may have a configuration in which the NAND strings 212 are two-dimensionally or three-dimensionally arranged.

In writing into the memory cell array 211, the peripheral circuit 210 injects an amount of charge corresponding to the data into the charge storage layer of each of the plurality of memory cell transistors MT constituting the write destination page. In reading from the memory cell array 211, the peripheral circuit 210 reads data according to the amount of charge stored in the charge storage layer from each of the plurality of memory cell transistors MT constituting the read destination page.

Each memory cell transistor MT can hold a value (data) of n (n≥1) bits or more. A storage mode in which n is 1 is referred to as a single level cell (SLC) mode. In a case where an n-bit value is held in each memory cell transistor MT, a storage capacity per memory cell group MCG is equal to the size of n pages. A storage mode in which n is 2 is referred to as a multi-level cell (MLC) mode (2-bit MLC). A storage mode in which n is 3 is referred to as a triple level cell (TLC) mode (3-bit MLC). A storage mode in which n is 4 is referred to as a quad level cell (QLC) mode (4-bit MLC). These modes in which an n-bit value is held in one memory cell may be collectively and simply referred to as "storage mode".

A threshold voltage of each memory cell transistor MT is controlled within a certain range by the peripheral circuit 210. The controllable range of the threshold voltage is divided into $2^n$ sections, and pieces of n-bit data different from each other are assigned to sections, respectively.

Figure 4:
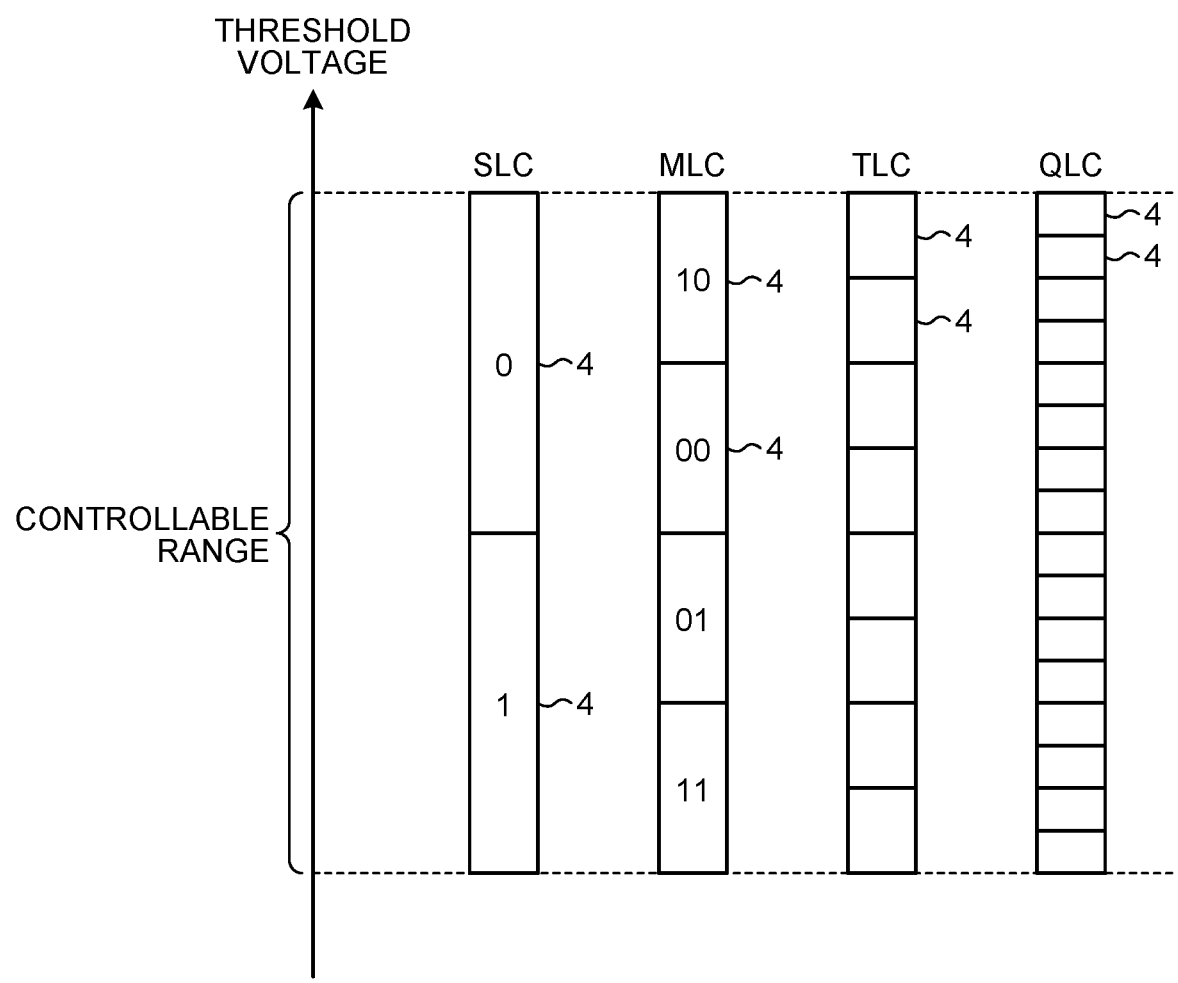
FIG. 4 is a diagram illustrating each section in various storage modes of the embodiment.

FIG. 4 is a diagram illustrating each section in various storage modes of the embodiment. As illustrated in FIG. 4, the range of the threshold voltage (controllable range) is divided into a plurality of sections 4.

For example, in a case of the SLC mode, the range of the threshold voltage is divided into two sections 4. In a case of the MLC mode, the range of the threshold voltage is divided into four sections 4. In a case of the TLC mode, the range of the threshold voltage is divided into eight sections 4. In a case of the QLC mode, the range of the threshold voltage is divided into 16 sections 4. The larger the number of bits of the value held in one memory cell, the narrower the range of each section 4. A value (data) is assigned to each section 4. In the SLC mode, data "1" is assigned to a section 4 on a low voltage side, and data "0" is assigned to a section 4 on a high voltage side. In a case of the MLC mode, for example, four pieces of data "11", "01", "00", and "10" are assigned to four sections.

Similarly, in a case of the TLC mode, eight pieces of 3-bit data "111", "110", "101", "100", "000", "011", and "001" are assigned to eight sections. Similarly, in a case of the QLC mode, 16 pieces of 4-bit data are assigned to 16 sections. Usually, "11" (in a case of the MLC mode), "111" (in a case of the TLC mode), and "1111" (in a case of the QLC mode) are assigned to the sections on the low voltage side. These sections correspond to a state in which data is erased.

A method of assigning data to each section 4 is not limited to the above example. Hereinafter, n, that is, the number of bits of the value held in one memory cell transistor MT may be referred to as the number of levels.

When performing writing with respect to the memory cell array 211, the peripheral circuit 210 injects charges of an amount corresponding to the section 4 to which data to be written is assigned into the charge storage layer of each memory cell transistor MT constituting a write destination page. When performing reading from the memory cell array 211, the peripheral circuit 210 determines the section 4 to which the threshold voltage of each memory cell transistor MT constituting a read destination page belongs, and outputs data assigned to the section 4 acquired by the determination as read data.

When performing erasing with respect to the memory cell array 211, the peripheral circuit 210 applies an erase voltage to a substrate of the memory cell array 211. Then, the peripheral circuit 210 conducts all the word lines WL of the block BLK that is an erase target to the ground potential. Then, in each memory cell transistor MT in the selected block BLK, the charge stored in the charge storage layer is discharged. As a result, the state of each memory cell transistor MT in the selected block BLK transitions to a state in which data is erased (that is, a section 4 on the lowest voltage side).

The memory system 1 can be configured to be able to perform reading and writing only in a single storage mode. Alternatively, the memory system 1 can be configured to be able to switch the storage mode during operation. A range of a storage area, which is a unit of switching of the storage mode, is arbitrary. For example, the unit of switching may be a block BLK unit.

In a case where the memory system 1 is configured to be able to switch the storage mode during operation, the storage mode of a part of the storage area (for example, some blocks BLK) in the memory system 1 is fixed to a first storage mode, and the storage mode of the other part of the storage area (for example, some other blocks BLK) is fixed to a second storage mode different from the first storage mode. Here, the memory system 1 may select a write destination block BLK according to the storage mode to be used. Alternatively, the memory system 1 may be configured to be able to change the storage mode of the storage area (for example, the storage area of each block BLK) among a plurality of storage modes during operation.

In the following description, as an example, it is assumed that the memory system 1 is configured to be able to perform switching between the storage mode of the SLC and the storage mode of the TLC.

Next, the state transition of the block BLK will be described.

Figure 5:
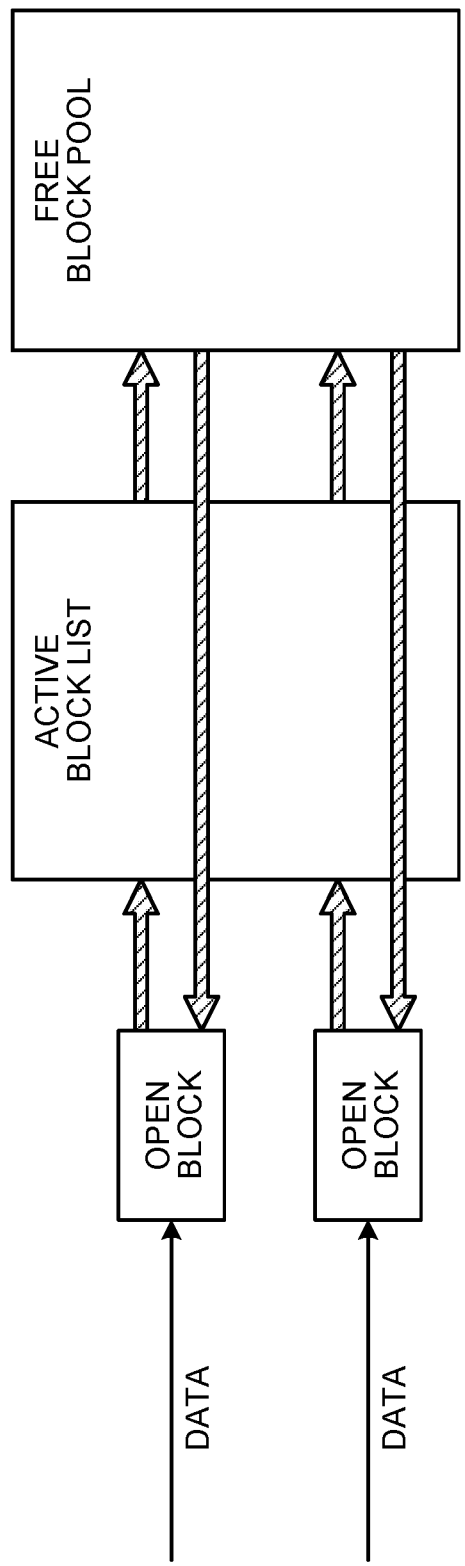
FIG. 5 is a diagram illustrating an example of a state transition of the block according to the embodiment.

FIG. 5 is a diagram illustrating an example of the state transition of the block BLK according to the embodiment. A hatched arrow indicates the state transition of the block BLK, and a solid arrow indicates data migration.

The state of the block BLK includes at least an open block, an active block, and a free block. The active block constitutes an active block list, and the free block constitutes a free block pool.

The open block is a block in which there is an area in which data can be written.

The active block is a block that cannot be reused yet among blocks for which data writing has been completed. Among the blocks for which data writing has been completed, a block in which valid user data is stored is managed as the active block. Reusing means transition to the open block.

The free block is a block in which no valid user data is stored. The free block is a reusable block.

For example, when an amount of data corresponding to one block BLK is written in an open block, the open block will transition to active block. The data stored in the active block is either valid or invalid.

A case where the same logical address value as a logical address value designated when certain data (referred to as first data) is transmitted from the host 4 is designated and second data is transmitted in a state where the first data is stored in the active block will be considered.

In this case, the memory controller 2 writes the second data in an empty page of the open block, and manages the first data stored in the active block as invalid data. Therefore, valid user data and invalid user data can be mixed in the data stored in the active block.

Note that transmitting, by the host 4, new data while designating the same logical address value as a logical address value designated when old data is transmitted to the memory system 1 is referred to as rewriting.

The active block transitions to the free block by garbage collection. The garbage collection refers to processing of transcribing valid data stored in the block BLK that is the active block to the block BLK that is the open block and invalidating all data stored in the block BLK that is a transcription source. As a result, the block BLK that is the transcription source transitions from the active block to the free block. Note that the transcription can be rephrased as transfer or migration.

The free block transitions to the open block after stored data is erased.

Note that "data is valid" means that a position where the data is stored is mapped to any logical address value. "Data is invalid" means that the position where the data is stored is not mapped to any logical address value. Here, "empty state" refers to a state in which neither invalid data nor valid data is stored. That is, the empty page is an empty area in which data can be written. Note that a correspondence between the position in the block BLK and the logical address value is maintained and updated by the memory controller 2.

The open block may be individually prepared for each of the host access processing and the transcription processing. The open block for the host access processing and the open block for the transcription processing may be prepared. In a case where the switching of the storage mode can be performed in units of blocks BLK, the open block may be prepared for each storage mode.

Furthermore, not only the open block but also the active block list and the free block pool may be prepared for each storage mode.

For example, a TLC active block list constituted by one or more TLC active blocks and an SLC active block list constituted by one or more SLC active blocks may be prepared.

In addition, a TLC free block pool constituted by TLC free blocks and an SLC free block pool constituted by SLC free blocks may be prepared. In addition, the memory controller 2 may manage whether the block is active or free independently for an SLC block group and a TLC block group.

As described above, it is assumed that an SLC block pool and a TLC block pool are prepared as the active block list and the free block pool.

When a random write request made from the host 4 continues for a predetermined period, locality of a valid cluster ratio decreases accordingly. Here, random writing means that write access with low locality continues, and for example, means that the host 4 instructs a write destination not to be continuous in a logical address space. In addition, a cluster refers to an area larger than an area called a sector. Here, the sector is an area corresponding to one logical address and is a minimum recording unit.

When the memory system 1 performs writing with respect to the NAND memory 3 in response to the random write request as described above, the number of times valid data is transcribed from the TLC active block that is a garbage collection target is affected. Details of this point will be described later.

Therefore, in a case where the SLC active block and the TLC active block are set, respectively, the memory system 1 of the present embodiment efficiently performs the garbage collection of the TLC block by using the SLC active block.

(Functions of Memory Controller)

Figure 6:
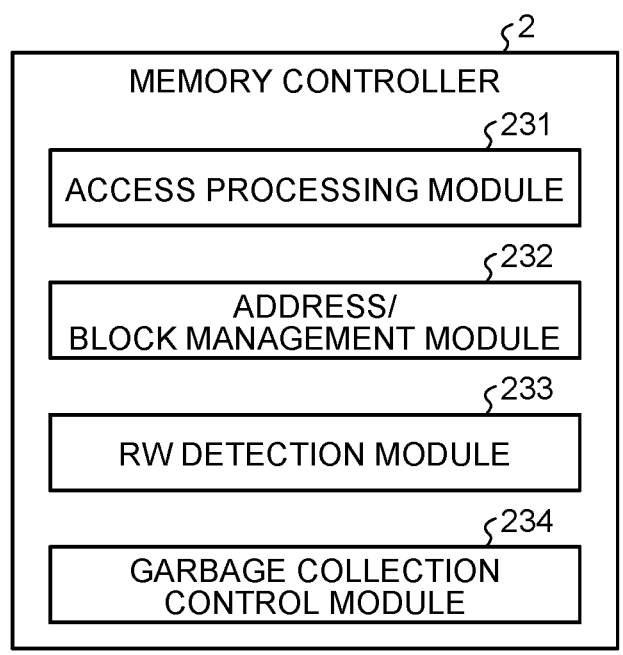
FIG. 6 is a diagram illustrating functional blocks of a memory controller according to the embodiment.

FIG. 6 is a diagram illustrating functional blocks of the memory controller 2 according to the embodiment.

As illustrated in FIG. 6, the memory controller 2 includes, for example, an access processing module 231, an address/block management module 232, a random write detection module 233 (hereinafter, referred to as an RW detection module 233), and a garbage collection control module 234 as functions implemented by the control unit 23 which is a processor. With these functional units, the memory controller 2 integrally controls each component of the memory system 1.

In a case where the access command is received from the host 4 via the host I/F 21, the access processing module 231 performs a control according to the access command. The access command from the host 4 is, for example, a write command, a read command, or the like. For example, the access processing module 231 instructs the memory I/F 22 to perform writing with respect to the NAND memory 3 according to the access command from the host 4. In addition, the access processing module 231 instructs the memory I/F 22 to perform reading from the NAND memory 3 according to the access command from the host 4.

The access command includes logical position information. The memory system 1 provides the logical address space to the host 4. The logical position information indicates a position in the logical address space. The host 4 designates a position where the user data is to be written or a position where the user data is to be read by using the logical position information.

For example, a logical block address (LBA) can be applied as the logical position information (logical address).

In addition, for example, in a case where NVMe (registered trademark) is adopted as an interface standard of communication between the memory system 1 and the host 4, identification information of a namespace and position information (for example, LBA) indicating a position in the namespace can be applied as the logical position information. The namespace is a logical address space specified by the identification information of the namespace, which is a part of the logical address space that can be provided by the memory system 1. Therefore, the memory system 1 conforming to the NVMe standard can divide one logical address space into a plurality of logical address spaces and manage the logical address spaces.

Hereinafter, the logical position information included in the access command is also referred to as the logical address or the LBA.

In a case where the write command is received, the access processing module 231 notifies the RW detection module 233 of the LBA which is the logical address included in the write command. In addition, the access processing module 231 notifies the address/block management module 232 of the LBA, and acquires a physical address mapped to the LBA from the address/block management module 232.

Note that the physical address is position information indicating a position in the storage area included in the NAND memory 3. The access processing module 231 instructs the memory I/F 22 to perform writing with respect to the NAND memory 3 based on the physical address acquired from the address/block management module 232.

The memory I/F 22 reads data requested to be written by the write command from the data buffer 25 and writes the data in the position indicated by the physical address. After completion of the writing of the data, the access processing module 231 notifies the address/block management module 232 of the logical address and the physical address in pairs.

In addition, in a case where the access processing module 231 receives the read command from the host 4, the access processing module 231 instructs the memory I/F 22 to perform reading with respect to the NAND memory 3 based on the physical address acquired from the address/block management module 232.

The address/block management module 232 manages information in which the logical address and the physical address are mapped to each other and information regarding the block to be described later.

Specifically, in a case where the access processing module 231 receives the write command from the host 4, the address/block management module 232 determines the physical address indicating a write destination of data stored in the data buffer 25. The address/block management module 232 records a correspondence between the logical address of data received together with the write command from the host 4 and the physical address indicating the position on the NAND memory 3 in which the data is stored in an address conversion table, and manages the write destination of the data by using the address conversion table. The address/block management module 232 receives the LBA from the access processing module 231 and notifies the access processing module 231 of the physical address corresponding to the LBA.

The logical address space provided by the memory system 1 is divided into a plurality of segments. Each segment includes a plurality of unit areas to which consecutive logical addresses are allocated. The address/block management module 232 manages the address conversion table in units of segments. The size of the segment is uniform, for example. The management of the address conversion table in units of segments will be described later.

The address/block management module 232 acquires a write amount, and the LBA and physical address of the write destination from the access processing module 231 after completion of the writing. Then, the address/block management module 232 updates the address conversion table corresponding to the LBA and the physical address.

More specifically, the address/block management module 232 updates the state of the segment corresponding to the LBA and the physical address in the address conversion table. The state of the segment corresponding to the LBA of the write target is set to an updated and non-volatilized state.

In a case where the access processing module 231 receives the read command from the host 4, the address/block management module 232 receives the LBA from the access processing module 231 and notifies the access processing module 231 of the physical address corresponding to the LBA.

Figures 7, 8:
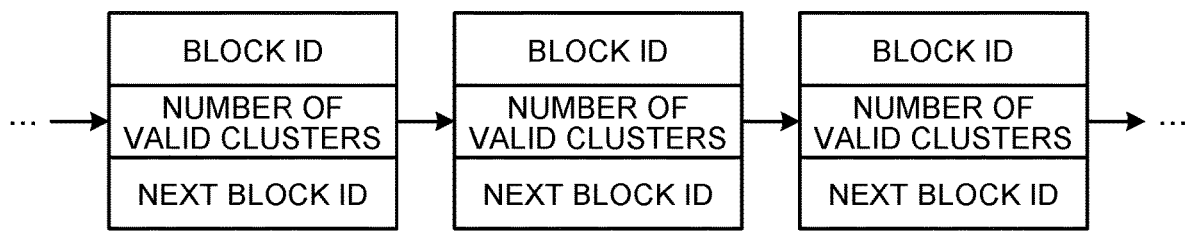
FIG. 7 is a diagram illustrating an example of an address conversion table of the embodiment.
FIG. 8 is a diagram illustrating an example of a queue table of the embodiment.

Here, an example of the address conversion table is illustrated in FIG. 7.

FIG. 7 is a diagram illustrating an example of the address conversion table. As illustrated in FIG. 7, the address conversion table has a data structure indicating a correspondence between a plurality of consecutive logical addresses and a plurality of physical addresses. The address conversion table is divided in units of segments, and the state of the address conversion table is recorded for each segment.

Note that, here, as an example, each segment includes a plurality of unit areas to which 128 consecutive logical addresses are allocated. The size of each segment is not limited thereto.

A main body of the address conversion table is stored in the NAND memory 3, and is cached in a volatile memory such as the RAM 24 in units of segments. Managing the address conversion table in units of segments means that a unit of caching of the address conversion table is a segment unit.

When at least a part of a certain segment on the cache is updated, the segment on the cache and the segment of the main body in the NAND memory 3 do not coincide with each other. Such a state is referred to as dirty. By writing the dirty segment on the cache in the NAND memory 3, contents of the segment of the cache and the segment written in the NAND memory 3 become the same. As a result, the segment is changed from dirty to non-dirty. As such, the above-described non-volatilization refers to an operation of making the dirty segment on the cache non-dirty by writing the dirty segment on the cache in the NAND memory 3.

In addition, when a TRIM (unmap) command designated as the logical address or a FORMAT command for an entire drive is received from the host 4, the address/block management module 232 sets an unmapped state in which no physical address is mapped to the logical address.

For example, FIG. 7 illustrates a case where Segment 4 is in the unmapped state. In addition, when writing is performed with respect to the logical address in the unmapped state, the address/block management module 232 maps the logical address and the physical address to each other. Note that a ratio of a segment in a mapped state, which is a state in which the logical address and the physical address are mapped to each other, to the logical address space of a user capacity of the entire drive is referred to as an LBA_MAP ratio.

In a case where the TRIM command for the LBA to which the physical address is mapped is processed, the mapped state transitions to the unmapped state, and in a case where the write command for the LBA in the unmapped state is processed, the unmapped state transitions to the mapped state. In the former case, the LBA_MAP ratio decreases, and in the latter case, the LBA_MAP ratio increases.

In a case where the state of the segment is the updated state and is not the non-volatilized state, the segment is a so-called dirty segment. The address/block management module 232 calculates a dirty amount (the number of segments that are dirty) of the address conversion table and notifies the RW detection module 233 of the dirty amount and the write amount.

In the present embodiment, the address/block management module 232 manages the SLC block and the TLC block. For each block, the address/block management module 232 stores block management information in which the identification information of the block, the physical address, information indicating whether the block is the TLC block or the SLC block, information indicating the number of valid clusters, information indicating the state of the block, and a write/erase cycle (that is, the number of repetitions of writing and erasing) are associated with each other. Here, the information indicating the state of the block is information indicating whether the block is in an active state, a free state, or an open state.

In addition, the address/block management module 232 manages an SLC active queue table which is information for configuring a queue of the SLC active blocks based on a result of sorting the active blocks among the SLC blocks based on the number of valid clusters.

For example, the address/block management module 232 manages information of blocks indicating a head and a tail of the SLC active block and information indicating the next block when the blocks are arranged in ascending order of the number of valid clusters.

The address/block management module 232 manages a TLC active queue table which is information for configuring a queue of the active blocks based on a result of sorting the active blocks among the TLC blocks based on the number of valid clusters. The TLC active queue table is used to determine a block to be subjected to the garbage collection. In addition, the SLC active queue table is used to determine a block to be changed to the TLC active block.

Note that the address/block management module 232 may manage an SLC free queue table for the SLC free block, or may manage a TLC free queue table for the TLC free block. In this case, the queue is configured in ascending order of write cycle.

FIG. 8 is a diagram illustrating an example of a queue table. The queue table is a table that manages the number of valid clusters in the SLC block and the TLC block for each block. Each block has a block ID, respectively. In FIG. 8, pieces of information including the number of valid clusters related to one block are managed in ascending order of the number of valid clusters as a singly linked list. One entry of the list includes the number of valid clusters, the block ID (the block ID is also referred as a block number, such as "#**"), and information on a pointer to the next entry. Note that the queue table may be a doubly linked list. Note that the queue table may include the valid cluster ratio in addition to the number of valid clusters.

Here, the valid cluster ratio is a value calculated by (the number of valid clusters included in the block)÷(the total number of clusters included in the block).

In a case of following the above definition, a priority in selection as the garbage collection target is the same between the SLC active block and the TLC active block. On the other hand, in order to select the SLC active block as the garbage collection target in preference to the TLC active block, correction may be performed at the time of calculating the valid cluster ratio. For example, the total number of clusters included in the SLC block is multiplied by a constant (for example, three times), or an offset is added. Alternatively, the number of valid clusters included in the TLC block is multiplied by a constant (for example, three times), or an offset is added. The above-described corrections may be used in combination.

In addition, when the access processing module 231 acquires the LBA and the physical address after completion of the writing, the address/block management module 232 updates the number of valid clusters in the TLC active queue table. Then, the address/block management module 232 calculates the valid cluster ratio in the TLC active block and notifies the RW detection module 233 of the valid cluster ratio.

When a notification that a condition of a random write state is satisfied is received from the RW detection module 233, the address/block management module 232 sets the SLC block as the TLC block. Specifically, the address/block management module 232 performs processing of setting a block defined in the SLC queue table in a queue of the TLC blocks. The condition of the random write state will be explained later in detail.

Here, the locality relating to valid cluster ratio and write access will be described, using FIGS. 9A and 9B.

Figure 9A:
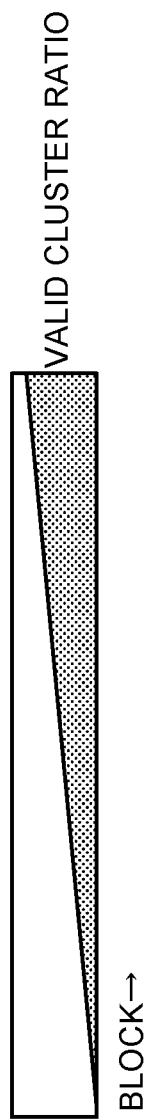
FIGS. 9A and 9B are graphs each illustrating a valid cluster ratio of each block in a case where TLC active blocks of the embodiment are arranged in ascending order of valid cluster ratio.
Figure 9B:
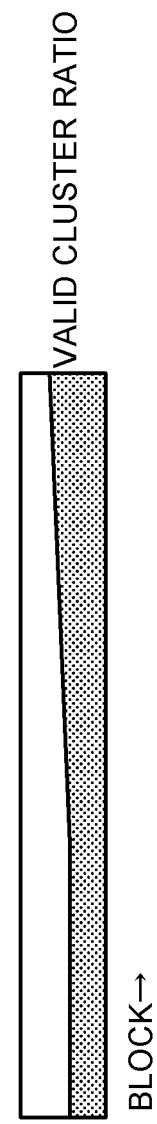

FIGS. 9A and 9B are graphs schematically illustrating examples of two typical blocks, in which the TLC active blocks are arranged in ascending order of valid cluster ratio. Note that, here, it is assumed in both drawings that a request to write the same amount of data is made from the host 4 during a predetermined period.

FIG. 9A illustrates a case where, in the write request from the host 4, there are a larger number of overlapping blocks designated by the LBA, and rewriting is concentrated on certain blocks. In this case, the valid cluster ratio varies among the blocks, for example, the valid cluster ratio of a certain block is relatively low and the valid cluster ratio of another block is relatively high. Here, such variation is expressed as high locality of the write access and the valid cluster ratio.

On the other hand, FIG. 9B illustrates a case where, in the write request from the host 4, there are a small number of overlapping blocks designated by the LBA and the rewriting of the block is distributed. In this case, the valid cluster ratios of the respective blocks are substantially uniform as a whole. Here, such variation is expressed as low locality of the write access and the valid cluster ratio.

In a case of FIG. 9B, when the garbage collection is performed, even in a case where a block having the lowest valid cluster ratio is selected as a transcription source block, the valid cluster ratio of the transcription source block tends to be higher than that in a case of FIG. 9A, and a processing load of the garbage collection is high. The processing load is an amount of data to be transcribed by GC. Here, the total number of valid clusters included in the TLC active block is substantially constant. The address/block management module 232 performs processing of setting a block defined in the SLC queue table in the queue of the TLC blocks. Such processing corresponds to increasing the number of TLC blocks. Since the number of valid clusters is constant and the number of blocks increases, the valid cluster ratio of the block when the block having the lowest valid cluster ratio is selected can be lowered. That is, a state close to the state in FIG. 9A can be implemented. As a result, the processing load of the garbage collection can be reduced.

Next, an example in which a block of the SLC queue table is set in the queue of the TLCs block will be described with reference to FIG. 10.

Figure 10:
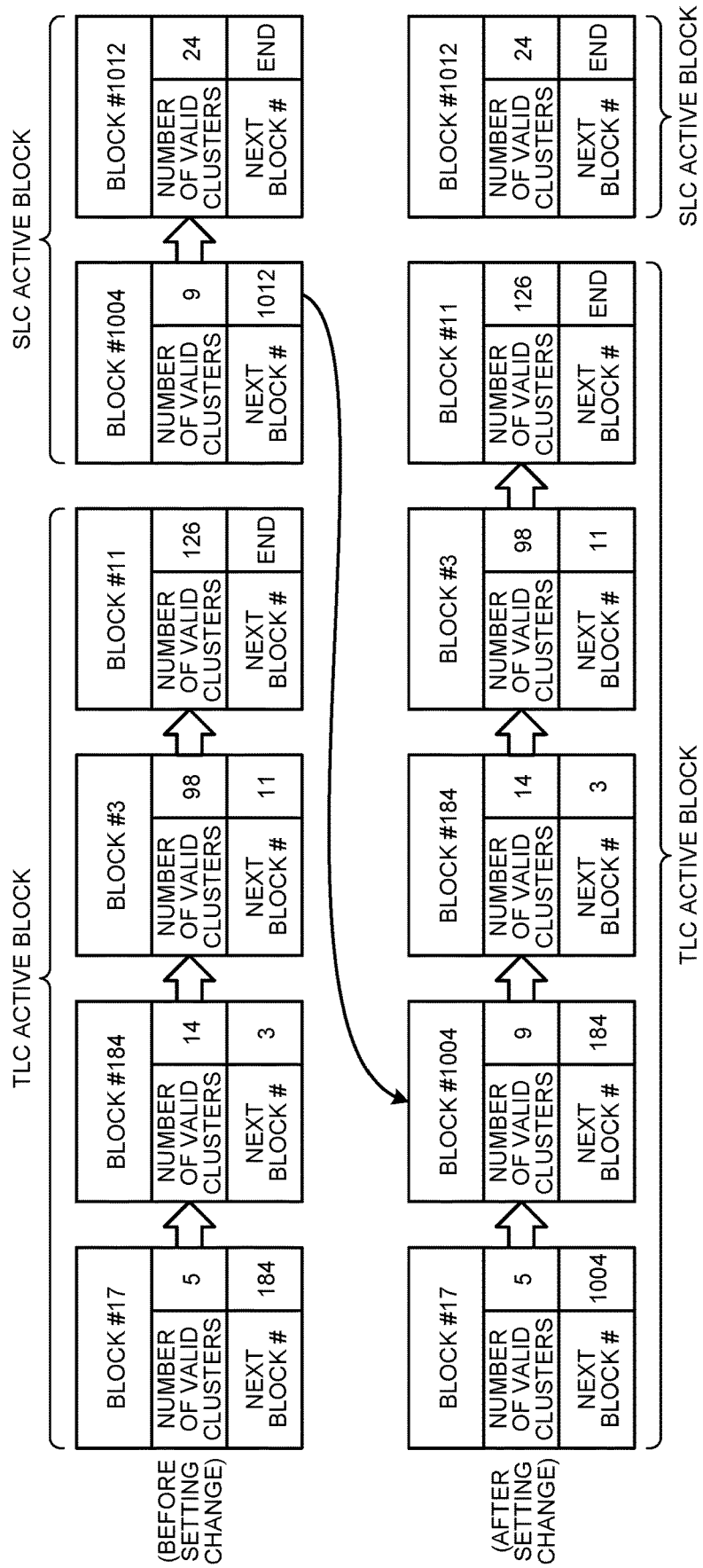
FIG. 10 is a diagram illustrating an example in which a block of an SLC queue table of the embodiment is set in a queue of a TLC block.

FIG. 10 is a diagram illustrating an example in which a block of the SLC queue table embodiment is set in the queue of the TLC blocks.

The TLC active blocks before the setting change include blocks with block numbers "#17", "#184", "#3", and "#11", and are ordered based on the number of valid clusters. In addition, the SLC active blocks SLC include blocks with block numbers "#1004" and "#1012", and are ordered based on the number of valid clusters.

When the notification indicating the random write state is received from the RW detection module 233, the address/block management module 232 sets the block with the block number "#1004", which is a block including a small number of valid clusters among the SLC active blocks, as the TLC active block. In accordance with this setting, the address/block management module 232 updates the SLC active queue table and the TLC active queue table, and updates the block management information.

As described above, when the notification indicating the random write state is received from the RW detection module 233, the address/block management module 232 sets the SLC active block as the TLC active block, thereby increasing the number of TLC active blocks. As a result, a physical capacity of the entire drive can be increased.

Figure 11A:
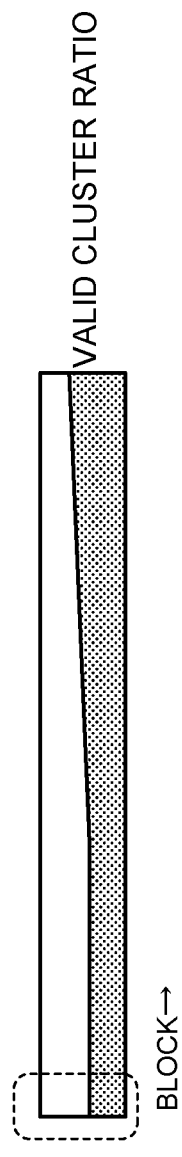
FIG. 11A is a graph illustrating a valid cluster ratio of each block in a case where TLC active blocks of the embodiment are arranged in ascending order of valid cluster ratio.
Figure 11B:
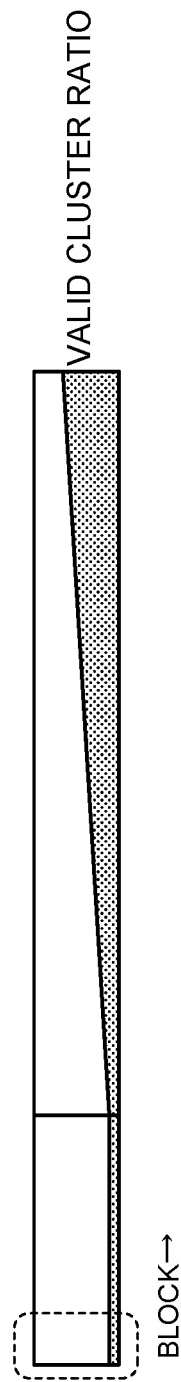
FIG. 11B is a graph illustrating a valid cluster ratio of each block in a case where TLC active blocks of the embodiment are arranged in ascending order of valid cluster ratio.

For example, in a case where the valid cluster ratios of the blocks are substantially uniform as illustrated in FIG. 11A, the number of TLC active blocks is increased as illustrated in FIG. 11B. As a result, the number of valid clusters of each of the TLC active blocks can be decreased, the valid cluster ratio of the block to be subjected to the garbage collection can be lowered, and efficiency in the garbage collection can be improved.

As described above, when the notification indicating the random write state is received from the RW detection module 233, the address/block management module 232 sets the SLC active block as the TLC active block.

When the notification indicating the random write state is received from the RW detection module 233, the address/block management module 232 may set a plurality of SLC active blocks among the SLC active blocks as the TLC active blocks. Furthermore, the address/block management module 232 may determine in advance the number of blocks for setting the SLC active block as the TLC active block.

The address/block management module 232 determines the block to be subjected to the garbage collection and the write destination block at a predetermined timing, notifies the garbage collection control module 234 of the physical addresses of these blocks, and causes the garbage collection control module to perform the garbage collection. The predetermined timing is, for example, a timing at which a notification indicating that a release condition to be described later is satisfied is received from the RW detection module 233.

When the LBA and the physical address are received from the garbage collection control module 234, the address/block management module 232 updates the address conversion table based on the LBA and the physical address. Note that the address/block management module 232 also updates the state of the address conversion table at the time of updating the address conversion table.

The address/block management module 232 calculates the dirty amount of the address conversion table and notifies the RW detection module 233 of the calculated dirty amount and the write amount.

In addition, the address/block management module 232 updates the number of valid clusters in the TLC active block. Then, the address/block management module 232 calculates the valid cluster ratio in the TLC active block and notifies the RW detection module 233 of the valid cluster ratio.

The address/block management module 232 sets the free block as the SLC free block in a case where a sufficient number of TLC free blocks are secured, for example, in a case where the number of free blocks reaches a predetermined number when the garbage collection is performed in a case where the notification indicating that the release condition is satisfied is received from the RW detection module 233. Note that in a case where the number of free blocks does not reach the predetermined number, the address/block management module 232 causes the garbage collection control module 234 to further perform the garbage collection.

The RW detection module 233 determines whether or not a random write condition, which is a condition for detecting the random write state, is satisfied. In addition, the RW detection module 233 determines whether or not the release condition, which is a condition for releasing the state in which the random write state is detected, is satisfied.

The RW detection module 233 determines whether or not the following random write conditions are satisfied.

(Random Write Condition 1)

In a case where the valid cluster ratios of the TLC active blocks are arranged in ascending order, the lowest valid cluster ratio is equal to or more than a predetermined threshold (for example, 70%). Note that handling in a case where the lowest valid cluster ratio is equal to the threshold is not limited thereto.

(Random Write Condition 2)

A range of the valid cluster ratio of the active block is less than a predetermined threshold. Note that handling in a case where the range of the valid cluster ratio of the active block is equal to the threshold is not limited thereto. Here, the range of the valid cluster ratio is a difference between the maximum value and the minimum value of the valid cluster ratio, a dispersion of the valid cluster ratios, or the like.

(Random Write Condition 3)

A GC gear ratio is equal to or more than a predetermined threshold. Note that handling in a case where the GC gear ratio is equal to the threshold is not limited thereto.

(Random Write Condition 4)

As a result of monitoring the LBA of the write command, the degree of dispersion of the LBAs is equal to or more than a predetermined threshold. Here, the RW detection module 233 may receive the logical address of the write command from the access processing module 231 and detect a random write access pattern with the discontinuity. Note that handling in a case where the degree of dispersion of the LBAs is equal to the threshold is not limited thereto. Here, the degree of dispersion of the LBAs is a difference, a dispersion, a standard deviation, or the like between the maximum value and the minimum value of the LBA in a certain amount of writing by the host 4.

(Random Write Condition 5)

An increase of the dirty amount with respect to the write amount is equal to or more than a predetermined threshold. Note that handling in a case where the increase of the dirty amount with respect to the write amount is equal to the threshold is not limited thereto.

(Random Write Condition 6)

The number of blocks that have a high valid cluster ratio even when a long time has elapsed after writing is equal to or more than a predetermined threshold. Note that handling in a case where the number of blocks that have a high valid cluster ratio even when a long time has elapsed after writing is equal to the threshold is not limited thereto.

Note that, for the random write condition 2, the random write condition 4, the random write condition 5, and the random write condition 6, it is assumed that the LBA_MAP ratio is equal to or more than a certain value (for example, 756) as a premise. Here, the LBA_MAP ratio refers to a ratio of a capacity corresponding to the logical address associated with the NAND memory 3 in the address conversion table to the user capacity. The user capacity indicates a maximum capacity capable of storing user data in the entire memory system. The user capacity is also referred to as a system user capacity. Note that the threshold in the random write condition 1 may be set to a value lower than the LBA_MAP ratio.

For the random write condition 1, the random write condition 2, and the random write condition 6, the RW detection module 233 determines whether or not each of the random write condition 1, the random write condition 2, and the random write condition 6 is satisfied based on the valid cluster ratio of the TLC active block acquired as information on writing in the TLC block from the address/block management module 232.

The lowest valid cluster ratio being equal to or more than the predetermined threshold in a case where the valid cluster ratios of the TLC active blocks are arranged in ascending order as in the random write condition 1 indicates that the number of transcriptions from the block to be subjected to the garbage collection is large. Therefore, in a case where the random write condition 1 is satisfied, the RW detection module 233 detects the random write state.

The range of the valid cluster ratio of the active block being less than the predetermined threshold as in the random write condition 2 indicates that the locality of the valid cluster ratio is low as illustrated in FIG. 9B. Therefore, in a case where the random write condition 2 is satisfied, the RW detection module 233 detects the random write state.

The number of blocks that have a high valid cluster ratio even when a set time has elapsed after writing being equal to or more than the predetermined threshold as in the random write condition 6 indicates that the locality of the valid cluster ratio is low as illustrated in FIG. 9B due to the random writing.

Therefore, in a case where the random write condition 6 is satisfied, the RW detection module 233 detects the random write state. In addition, the RW detection module 233 performs measurement based on a time measured by a timer, a host write amount, a block allocation number, or the like as an index for measuring the lapse of time in the random write condition 6. The host write amount here refers to a host write amount after writing in a target active block.

Here, the block allocation number is an ascending number set when the free block is allocated as the write destination block. By comparing the block allocation number of the target active block with the latest block allocation number, the RW detection module 233 can determine how much time has elapsed after the writing in the target active block.

The GC gear ratio in the random write condition 3 is a value obtained by dividing the amount of data written in the NAND memory 3 by garbage collection writing by the amount of data written in the NAND memory 3 by host writing.

For the random write condition 3, the RW detection module 233 determines whether or not the random write condition 3 is satisfied based on the write amount at the time of the garbage collection acquired as the information on writing in the TLC block from the address/block management module 232 and the write amount at the time of the host writing. The GC gear ratio being equal to or more than the threshold indicates that the write amount in the garbage collection is large, and that the number of transcriptions from the garbage collection target block is large.

Therefore, in a case where the random write condition 3 is satisfied, the RW detection module 233 detects the random write state.

Note that the RW detection module 233 may change a threshold for determining whether or not the random write condition 3 is satisfied. For example, the RW detection module 233 may lower the threshold according to the number of SLC blocks set as the TLC blocks by the address/block management module 232. This is because the gear ratio tends to decrease when the number of SLC blocks set as the TLC blocks is large.

For the random write condition 4, the RW detection module 233 determines whether or not the random write condition 4 is satisfied based on the LBA acquired as the access information of the TLC block from the access processing module 231. The degree of dispersion of the LBAs being equal to or more than the threshold as in the random write condition 4 indicates that the LBA varies due to the random writing.

Therefore, in a case where the random write condition 4 is satisfied, the RW detection module 233 detects the random write state.

For the random write condition 5, the RW detection module 233 determines whether or not the random write condition 5 is satisfied based on the dirty amount and the write amount acquired as the information on writing in the TLC block from the address/block management module 232.

In general, the dirty amount increased with respect to the same host write amount in a case of the random writing is larger than that in a case of sequential writing. Therefore, in a case where the increase of the dirty amount with respect to the write amount is equal to or more than a certain threshold as in the random write condition 5, there is a high possibility of the random writing. Therefore, in a case where the random write condition 5 is satisfied, the RW detection module 233 detects the random write state.

In addition, the RW detection module 233 may change the threshold based on the change of the valid cluster ratio of the block or the like. For example, in a case where a result of determination of whether or not the random write condition 1 is satisfied indicates that the degree of increase in the lowest valid cluster ratio is equal to or more than a certain value, the threshold may be lowered. In this case, the RW detection module 233 can set, as the TLC block, the block set as the SLC block at a timing at which the random writing becomes prominent.

In a case where any one of the random write condition 1 to the random write condition 6 is satisfied, the RW detection module 233 detects the random write state and notifies the address/block management module 232 of the random write state.

After detecting the random write state, the RW detection module 233 determines whether or not the release condition is satisfied. The RW detection module 233 determines whether or not the following release conditions are satisfied.

(Release Condition 1)

A set time has elapsed after the random write condition 1 to the random write condition 6 are no longer satisfied.

(Release Condition 2)

The number of blocks that have a low valid cluster ratio even when a long time has not elapsed after writing is equal to or more than a predetermined threshold. Note that handling in a case where the number of blocks that have a low valid cluster ratio is equal to the threshold is not limited thereto.

(Release Condition 3)

A request from the host is in an idle state.

As in the random write condition 6, the RW detection module 233 performs measurement based on the time measured by the timer, the host write amount, the block allocation number, or the like as an index for measuring the lapse of time in the release condition 1 and the release condition 2.

In a case where the set time has elapsed after the random write condition 1 to the random write condition 6 are no longer satisfied as in the release condition 1, it is considered that the random write state has been released. Therefore, in a case where the release condition 1 is satisfied, the RW detection module 233 releases the detection of the random write state.

For the release condition 2, the RW detection module 233 determines whether or not the release condition 2 is satisfied based on the valid cluster ratio in the TLC active block acquired from the address/block management module 232 as the information on writing in the TLC block.

The number of blocks that have a low valid cluster ratio being equal to or larger than the threshold even when a long time has not elapsed after writing as in the release condition 2 indicates that the locality of the valid cluster ratio is high as illustrated in FIG. 9A. Therefore, in a case where the release condition 2 is satisfied, the RW detection module 233 releases the detection of the random write state.

The request from the host 4 being in the idle state as in the release condition 3 indicates that there is no access from the host 4 for a certain period. The fact that there is no access from the host 4 for a certain period serves as a trigger for performing background processing such as the garbage collection. Therefore, in a case where the release condition 3 is satisfied, the RW detection module 233 releases the detection of the random write state. Note that a request for transition to a low power mode from the host 4 can also serve as a trigger for performing background processing such as the garbage collection.

In a case where any one of the release condition 1 to the release condition 3 is satisfied, the RW detection module 233 notifies the address/block management module 232 that the release condition is satisfied.

The garbage collection control module 234 performs the garbage collection. The garbage collection control module 234 acquires the physical addresses of the garbage collection target block and the write destination block from the address/block management module 232, and performs the garbage collection based on these addresses. The garbage collection control module 234 reads valid data from the garbage collection target block, reads the LBA corresponding to the data, and performs the garbage collection. The garbage collection control module 234 transmits the LBA and the physical address of the data written by the garbage collection to the address/block management module 232.

Next, a state transition of the SLC block and the TLC block will be described with reference to FIG. 12.

Figure 12:
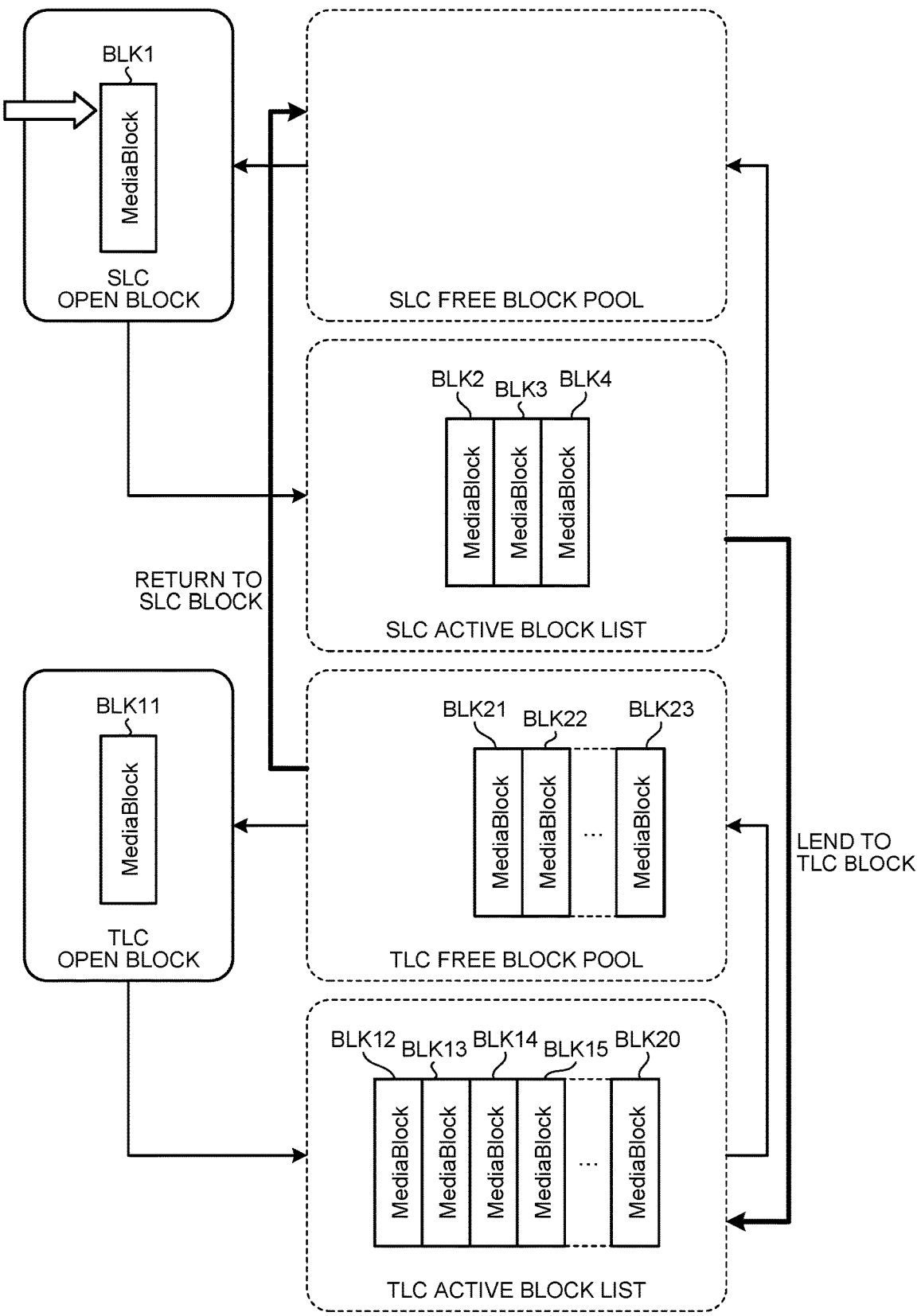
FIG. 12 is a diagram for describing a state transition of an SLC block and a TLC block of the embodiment.

FIG. 12 is a diagram for describing the state transition of the SLC block and the TLC block.

First, when performing writing in the SLC mode, the access processing module 231 writes data in the block BLK1 that has transitioned from the SLC free block to the open block. Then, the address/block management module 232 changes the block BLK1 to the SLC active block.

Note that the blocks BLK2 to BLK4 are also the SLC active blocks. Here, when the RW detection module 233 detects the random write state, the address/block management module 232 sets one of the SLC active blocks as the TLC active block. That is, the address/block management module 232 lends the SLC active block as the TLC block (hereinafter, this process may be called "LENDING PROCESS").

When the writing or garbage collection is performed in the TLC mode, data is written in a block BLK11 that has transitioned from the TLC free block to the open block. Then, the address/block management module 232 changes the block BLK11 to the TLC active block.

When the RW detection module 233 detects that the release condition is satisfied, the address/block management module 232 sets one of the TLC free blocks as the SLC free block. That is, the address/block management module 232 returns the TLC free block (hereinafter, this process may be called "RETURN PROCESS").

Next, a processing procedure of detecting the random write state and setting the SLC block as the TLC block will be described with reference to FIG. 13.

FIG. 13 is a flowchart illustrating the processing procedure of setting the SLC block as the TLC block.

First, the RW detection module 233 acquires access information (for example, the valid cluster ratio of the TLC) related to the TLC block from the address/block management module 232 and the like (Step S1). Subsequently, the RW detection module 233 determines whether or not any one of the random write condition 1 to the random write condition 6 is satisfied based on the information on writing in the TLC block (Step S2). In Step S2, in a case where none of the random write condition 1 to the random write condition 6 is satisfied (Step S2: No), the processing proceeds to Step S1.

In Step S2, in a case where any one of the random write condition 1 to the random write condition 6 is satisfied (Step S2: Yes), the RW detection module 233 notifies the address/block management module 232 of the random write state. The address/block management module 232 sets the SLC block as the TLC block (Step S3). That is, "LENDING PROCESS" is performed by the address/block management module 232.

The RW detection module 233 acquires the access information related to the TLC block from the address/block management module 232 and the like (Step S4). The RW detection module 233 determines whether or not any one of the release condition 1 to the release condition 3 is satisfied based on the access information related to the TLC block and the like (Step S5). In Step S5, in a case where none of the release condition 1 to the release condition 3 is satisfied (Step S5: No), the RW detection module 233 proceeds to Step S4.

In Step S5, in a case where any one of the release condition 1 to the release condition 3 is satisfied (Step S5: Yes), the RW detection module 233 notifies the address/block management module 232 that the release condition is satisfied. The address/block management module 232 causes the garbage collection control module 234 to perform the garbage collection in response to the notification that the release condition is satisfied. The address/block management module 232 sets the TLC free block as the SLC free block based on the result of the garbage collection. As described above, the address/block management module 232 performs processing of returning the TLC free block as the SLC block (Step S6). That is, "RETURN PROCESS" is performed by the address/block management module 232.

In the memory controller 2 according to the present embodiment, the RW detection module 233 acquires the access information related to the TLC block from the address/block management module 232 and the like. Then, in a case where the RW detection module 233 determines that any one of the random write condition 1 to the random write condition 6 is satisfied based on the access information related to the TLC block, the address/block management module 232 sets the SLC block as the TLC block.

In a case where the RW detection module 233 determines that any one of the release condition 1 to the release condition 3 is satisfied, the garbage collection control module 234 performs the garbage collection, and the address/block management module 232 sets the TLC block as the SLC block.

As described above, in a case where any one of the random write condition 1 to the random write condition 6 is satisfied based on the access information related to the TLC block, the memory controller 2 sets the SLC block as the TLC block. Then, in a case where the release condition is satisfied, the memory controller 2 performs the garbage collection and sets the TLC block as the SLC block.

As a result, the memory controller 2 can detect the random write state and temporarily set the SLC block as the TLC block in a case where there is no locality to increase the number of TLC active blocks and decrease the distribution of the valid clusters of the TLC active blocks, thereby lowering the valid cluster ratio of the block to be subjected to the garbage collection and improving the efficiency in garbage collection.

After performing the garbage collection, the memory controller 2 returns to a state in which the write processing can be performed in the SLC mode with high performance in writing by using the TLC block as the SLC block. In this manner, the memory controller 2 can appropriately perform switching between a plurality of modes.

The RW detection module 233 determines whether or not the random write condition based on the valid cluster ratio in the TLC active block acquired as the access information related to the TLC block from the address/block management module 232 is satisfied. In a case where the random write condition is satisfied, the address/block management module 232 sets the SLC block as the TLC block. The random write condition based on the valid cluster ratio is at least one of the random write condition 1, the random write condition 2, or the random write condition 6.

In this manner, the memory controller 2 determines whether or not the condition based on the valid cluster ratio of the TLC active block is satisfied, and sets the SLC block as the TLC block.

For example, in a case where it is determined that there are many blocks having a high valid cluster ratio of the TLC active blocks and there is a high possibility of being in the random write state, the TLC block can be set to a high locality state. As a result, the garbage collection can be efficiently performed.

In a case where the random write condition 1 to the random write condition 6 are not satisfied, it is considered that the memory controller 2 has released the random write state. Therefore, in a case where the release condition 1 is satisfied, the RW detection module 233 releases the detection of the random write state.

In a case where there is no access from the host 4 for a certain period as the release condition, the memory controller 2 performs the garbage collection and sets the TLC block as the SLC block. The fact that there is no access from the host 4 for a certain period serves as a trigger for performing background processing such as the garbage collection, and thus the memory controller 2 can perform the garbage collection at an appropriate timing.

In the above-described embodiment, a case where the RW detection module 233 determines whether or not any one of the random write condition 1 to the random write condition 6 is satisfied has been described, but it may be determined whether or not a plurality of conditions among the random write condition 1 to the random write condition 6 are satisfied.

In addition, in the above-described embodiment, the random write condition 1 to the random write condition 6 have been listed, but only some of these conditions may be listed, or some conditions may be appropriately changed. In addition, a condition for determining the random write state may be further added.

Furthermore, in the above-described embodiment, a case where the RW detection module 233 determines whether or not any one of the release conditions 1 to 3 is satisfied has been described. However, it may be determined whether or not a plurality of release conditions among the release conditions 1 to 3 are satisfied.

In addition, when determining whether or not the release condition 1 is satisfied, the RW detection module 233 may determine whether or not the condition satisfied at the time of detecting the random write state among the random write condition 1 to the random write condition 6 is no longer satisfied, or may determine whether or not all of the random write condition 1 to the random write condition 6 are no longer satisfied.

In addition, the number of SLC blocks to be set as the TLC blocks by the address/block management module 232 may be determined in advance, or may be determined based on, for example, the number of satisfied conditions among the random write condition 1 to the random write condition 6.

In addition, in a case where the number of returned blocks is smaller than the number of SLC blocks set as the TLC blocks, the address/block management module 232 may set the number of blocks obtained by subtracting the number of unreturned blocks from a predetermined set number when the random write condition is satisfied again.

In the above-described embodiment, a case of performing writing in the SLC mode and the TLC mode has been described, but a mode in which the writing is performed is not limited thereto. For example, the writing may be performed in the SLC mode and the QLC mode, or the writing may be performed in the TLC mode and the QLC mode.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
    a nonvolatile memory that includes a plurality of blocks each including a plurality of memory cells; and
    a memory controller configured to control access to the nonvolatile memory and include an address/block management module which manages access information to the nonvolatile memory,
    the memory controller configured to:
        set a first block, among the plurality of blocks, to be written in a first mode, the first mode being a mode in which data of a first number of bits is written into the memory cell, and set a plurality of second blocks, among the plurality of blocks, to be written in a second mode, the second mode being a mode in which data of a second number of bits is written into the memory cell, the second number being larger than the first number;
        acquire the access information related to the plurality of second blocks from the address/block management module without acquiring information related to the first block; and
        change a writing mode of the first block which has been set in the first mode to the second mode when a first condition of the second blocks based on the access information is satisfied.

2. The memory system according to claim 1, wherein the memory controller is configured to change a writing mode of one of the plurality of second blocks which has been set in the second mode to the first mode when a second condition different from the first condition is satisfied after the writing mode of the first block has been changed to the second mode.

3. The memory system according to claim 1, wherein the memory controller is configured to:
   acquire information on valid cluster ratios of the plurality of second blocks as the access information related to the plurality of second blocks; and
   change the writing mode of the first block to the second mode when the first condition related to the valid cluster ratios of the plurality of second blocks is satisfied.

4. The memory system according to claim 3, wherein the first condition includes a condition based on a lowest valid cluster ratio among the valid cluster ratios of the plurality of second blocks.

5. The memory system according to claim 3, wherein the first condition includes a condition related to a range of the valid cluster ratios of the plurality of second blocks.

6. The memory system according to claim 3, wherein the first condition includes a condition related to the valid cluster ratios of the plurality of second blocks after a predetermined time elapses since writing into the plurality of second blocks.

7. The memory system according to claim 1, wherein the memory controller is configured to:
   acquire information on a write amount of garbage collection in the plurality of second blocks as the access information related to the plurality of second blocks; and
   change the writing mode of the first block to the second mode when the first condition based on the write amount of the garbage collection in the plurality of second blocks is satisfied.

8. The memory system according to claim 7, wherein the first condition based on the write amount of the garbage collection in the plurality of second blocks is that the write amount of the garbage collection in the plurality of second blocks exceeds a threshold.

9. The memory system according to claim 1, wherein the memory controller is configured to:
   acquire logical addresses of write targets corresponding to the plurality of second blocks as the access information related to the plurality of second blocks; and
   change the writing mode of the first block to the second mode when the first condition based on a degree of dispersion of the logical addresses of the write targets corresponding to the plurality of second blocks is satisfied.

10. The memory system according to claim 1, wherein the memory controller is configured to:
    acquire a dirty amount based on writing into the plurality of second blocks as the access information related to the plurality of second blocks; and
    change the writing mode of the first block to the second mode when the first condition based on the dirty amount is satisfied.

11. The memory system according to claim 2, wherein the second condition includes a condition based on a fact that the first condition is no longer satisfied.

12. The memory system according to claim 2, wherein the second condition includes a condition related to an idle state made by a host connected to the memory system.

13. A memory system control method executed by a memory system including a nonvolatile memory that includes a plurality of blocks each including a plurality of memory cells and a memory controller that includes an address/block management module for managing access information to the nonvolatile memory, the method comprising:
    (a) setting a first block, among the plurality of blocks, to be written in a first mode, the first mode being a mode in which data of a first number of bits is written into the memory cell, and setting a plurality of second blocks, among the plurality of blocks, to be written in a second mode, the second mode being a mode in which data of a second number of bits is written into the memory cell, the second number being larger than the first number;
    (b) acquiring the access information related to the plurality of second blocks from the address/block management module without acquiring information related to the first block; and
    (c) changing a writing mode of the first block which has been set in the first mode to the second mode when a first condition of the second blocks based on the access information is satisfied.

14. The memory system control method according to claim 13, further comprising:
    (d) changing a writing mode of one of the plurality of second blocks which has been set in the second mode to the first mode when a second condition different from the first condition is satisfied after the writing mode of the first block has been changed to the second mode.

15. The memory system control method according to claim 13, wherein
    the (b) acquiring includes acquiring information on valid cluster ratios of the plurality of second blocks as the access information related to the plurality of second blocks, and
    the (c) changing includes changing the writing mode of the first block to the second mode when the first condition related to the valid cluster ratios of the plurality of second blocks is satisfied.

16. The memory system control method according to claim 15, wherein the first condition includes a condition based on a lowest valid cluster ratio among the valid cluster ratios of the plurality of second blocks.

17. The memory system control method according to claim 16, wherein the first condition includes a condition related to a range of the valid cluster ratios of the plurality of second blocks.

18. The memory system control method according to claim 16, wherein the first condition includes a condition related to the valid cluster ratios of the plurality of second blocks after a predetermined time elapses since writing into the plurality of second blocks.

19. The memory system control method according to claim 13, wherein
    the (b) acquiring includes acquiring information on a write amount of garbage collection in the plurality of second blocks as the access information related to the plurality of second blocks, and
    the (c) changing includes changing the writing mode of the first block to the second mode when the first condition based on the write amount of the garbage collection in the plurality of second blocks is satisfied.

20. The memory system control method according to claim 19, wherein the first condition based on the write amount of the garbage collection in the plurality of second blocks is that the write amount of the garbage collection in the plurality of second blocks exceeds a threshold.

* * * * *